United States Patent Office 3,037,947
Patented June 5, 1962

3,037,947
FOAMED POLYURETHANE POLYMER AND
METHOD OF MAKING SAME
Harold Elkin, Trenton, N.J., assignor to Thiokol Chemical Corporation, Bristol, Pa., a corporation of Delaware
No Drawing. Filed Oct. 8, 1959, Ser. No. 845,063
6 Claims. (Cl. 260—2.5)

This invention relates to polymers, and relates particularly to foamed polymers having a high modulus, and to methods of making the same.

The rigidity of foamed polymers is commonly measured by determining the pressure required to produce compressive deformation to a predetermined value. This pressure value for a given deformation, is the "modulus" of the material being measured.

Heretofore, it has been difficult to obtain foamed polymers of high modulus. For example, the moduli of common polymer foams, for a 10 percent compressive deformation, have commonly been in the range of 5–8 pounds per square inch. The present invention provides a new foamed polymer having a modulus which is commonly in excess of 15 lbs./in.$^2$, throughout a range of foam densities.

The present polymers are formed from castor oil, castor oil derivatives, and certain glycols, reacted with an excess of a diisocyanate. In the presence of added water and a catalyst, and, advantageously, surface active materials, the polymer is foamed during curing to yield light, rigid materials of high modulus.

Castor oil, well known to the art, is the oil expressed from the castor bean, and is a pale yellow transparent liquid generally having a density, at 25° C., of about 0.945–0.965. The castor oil derivatives advantageously used in preparing the polymers of the invention are polyol recinoleates, such as the commercially available "Flexricin" materials. These materials are hydroxyl-rich castor oil derivatives obtained by partial esterification of polyols with ricinoleic acid, which is a principal component of castor oil. A preferred material of this type is principally propylene glycol monoricinoleate, having both a primary hydroxyl group on the propylene residue, and a secondary hydroxyl in the rincinoleic acid chain. The commercial material has an acid value of 4, an iodine value of 75, a saponification number of 159, and a density of 0.960.

In the preparation of the polymers, particularly good results have been obtained using a combination of trimethylol propane (TMP), CH$_3$CH$_2$C(CH$_2$OH)$_3$, and polyethylene glycol (PEG) of low average molecular weight, e.g. about 200, as the glycolic components of the reaction mixtures. It is this combination of glycols which is believed responsible for the excellent modulus in foams prepared therefrom.

The castor oil, castor oil derivative, and glycols, all of which contain reactive hydroxyl groups, are reacted with an aromatic diisocyanate, such as toluene diisocyanate. A suitable material is commercially available under the name "Hylene TM," and contains about 80 percent of the 2,4-isomer and 20 percent of the 2,6-isomer, through these isomers, or their proportions, are not critical to the invention.

The hydroxy compounds and the aromatic diisocyanate are reacted to give a pre-polymer. This pre-polymer, which can be formed by reacting its various components in several different orders, is simultaneously cured and blown by the addition of water and a catalyst to the material. The pre-polymer comprises addition products of the hydroxy compounds and the diisocyanate. A "capping" of the hydroxy sites results, leaving reactive isocyanato groups in their stead:

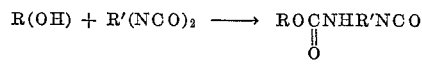

Simultaneously, chain extension occurs in the prepolymer by reaction or more than one molecule of the hydroxy compounds present with the diisocyanate:

Since the hydroxy compounds contain more than one hydroxyl group, and several different glycolic components are present, complex reaction products ensue.

The curing of the pre-polymer is effected by the addition of water. The pre-polymer may contain unreacted or added diisocyanate, and contains reactive isocyanato linkages which are coupled by a reaction which evolves gaseous carbon dioxide:

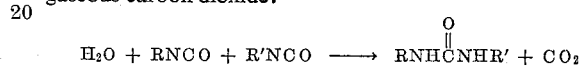

This curing reaction occurs with foaming of the mixture, and results in a cured rigid foam with an exceptionally high modulus.

The curing is advantageously effected in the presence of a basic catalyst, as known in the art. The foaming is preferably done at a controlled rate to avoid, on the one hand, too rapid gas evolution, i.e. complete evolution of gas before curing is completed, and on the other hand too slow evolution of gas, i.e., curing before adequate foaming is achieved. For this reason, curing is best done with a basic catalyst having a pH between 7 and 10. Although inorganic bases can be used, basic amines are preferred. Materials known to, and commonly used in the art, for example, triethylamine, dimethylamine, triethanol-amine, N-methyl morpholine, N-ethyl or N-coco morpholine, tetramethyl butanediamine, etc. Particularly good results have been obtained with a catalyst comprised of diethyl ethanolamine and diethyl ethanolamine hydrochloride. This material has a pH of about 10, and is conveniently used as an aqueous solution comprising about 30 parts by weight of amine, 6 parts of HCl (calculated as 100 percent HCl), and about 35 parts water.

To facilitate good foaming and to effect the desired ratio of open to closed pores in the foamed polymer, it is advantageous to add minor amounts of a surface active or wetting agent to the pre-polymer before foaming to decrease the surface tension of the fluid. This practice is well known in the art, as are the materials used, such as sorbitan esters of fatty acids, polyalcohol carboxylic acid esters blended with oil-soluble sulfonates, silicone fluids, polyoxyethylated adducts of fatty acids, polyoxyethylated vegetable oils, etc.

As mentioned earlier, the prepolymer may be prepared by combining the diisocyanate with the various glycol reactants in more than one order. For example, the castor oil and polyol derivative thereof may first be blended and then mixed with diisocyanate. Next, the trimethylol propane can be added and reacted with the mixture by heating for ½–2 hours at a temperature between 100° C. and 150° C. Additional diisocyanate may then be added with gentle warming until a compatible mixture results, followed by a simple addition of polyethylene glycol. This cooled reactive mixture is then finally cured by addition of water and catalyst, advantageously with a wetting agent present.

In an alternative preferred procedure, the polyethylene glycol is first mixed with the trimethylol propane, and the hydroxyl groups in the mixture "capped" by reaction with an excess of diisocyanate, with stirring, keeping the mixture at a temperature below about 70° C. A blend of castor oil and the polyol ricinoleate derivative is then conveniently added to the mixture containing excess diisocyanate, and reacted by heating at a temperature between about 80° C. and about 100° C. for periods of ½–2 hours. After cooling, foaming and curing of the prepolymer is accomplished by addition of catalyst and water. Additional foaming action can be obtained by the addition of a small amount of diisocyanate to the prepolymer. This material, in addition to the diisocyanate and isocyanato groups already present in the pre-polymer, reacts with water and foam.

In the preparation of the pre-polymer, the following proportions of reactants are advantageously used:

| Reactant | Parts by Weight | Molar Parts of Hydroxyl Furnished |
| --- | --- | --- |
| Castor oil | 700–1,000 | 2.2 –3.2 |
| Polyol ricinoleate (e.g. propylene glycol monoricinoleate) | 150–250 | 0.8 –1.4 |
| Trimethylol propane | 60–100 | 1.3 –2.2 |
| Aromatic diisocyanate | 1,850–2,750 | |
| Polyethylene glycol (M.W. about 200) | 575–700 | 5.75–7.00 |
| Water | 57–70 | |
| Catalyst [1] | 130–160 | |
| Wetting agents | 60–75 | |

[1] The catalyst advantageously comprises a basic amine and about an equal weight of the hydrochloride salt of the amine (pH of this mixture= 7 to 10), mixed with a weight of water about equal to the weight of amine and amine salt together, e.g.

Parts by weight
Diethylethanolamine _____ 25–35
HCl (as 100 percent HCl) _____ 5–7
Water _____ 30–40

From the table above, it can be seen that the molar parts of hydroxyl furnished by the polyethylene glycol component are at least 85 percent of the total amount of hydroxyl furnished by the other, non-polyethylene glycol, components.

Example 1

850 parts of castor oil were mixed with 200 parts glycerol monoricinoleate, and 1150 parts of toluene diisocyanate were added to the mixture. The ensuing reaction is exothermic, and after a maximum temperature had been reached, 79.5 parts of trimethylol propane were added. The mixture was then heated to 120° C. for 1 hour and cooled. 25 grams of this prepolymer were mixed with 12.5 grams of toluene diisocyanate and the mixture warmed until the components were compatible (e.g., heating at 70° C. for 10–15 minutes). 7 grams of polyethylene glycol were next added, and the mixture allowed to cool. Before blowing, 0.75 gram of wetting agents were mixed in, in particular 0.25 gram of sorbitan trioleate ("Span") and 0.5 gram of silicone fluid. Finally 1.6 grams of a catalyst mixture consisting of 30.3 parts by weight of diethyl ethanolamine, 6.2 parts HCl (calculated as 100 percent HCl), and 35.5 parts of water, were added, as well as 0.7 ml. of additional water. The catalyzed mixture foamed and cured at room temperature immediately thereafter. The foamed polymer had a density of 1.77 lbs./cu. ft. and a modulus of 18.3 at 10 percent deflection.

Example 2

A more dense foam with a density of 3.38 and a modulus of 23.0 at 10 percent deflection was prepared as in Example 1, except that 25 grams of polyethylene glycol and 37.5 grams of toluene diisocyanate were added to 25 grams of the first-mentioned prepolymer. The conditions of blowing were the same as in Example 1, except that 1.4 ml. of additional water, rather than 0.7 ml., were used.

Example 3

A prepolymer was prepared by dissolving 7.05 parts weight of trimethylol propane in 79.0 parts of polyethylene glycol warmed to about 35° C. This blend was fed into 284 parts of toluene diisocyanate over a ½ hour period. The reaction is exothermic, and the temperature during addition was kept below 75° C. The mixture was stirred for 15 minutes, at which time a blend of 105.1 parts of castor oil and 8.75 parts of glycerol monoricinoleate was added, keeping the temperature below 90° C. After all the material had been added, the mixture was heated at 90° C. for 1 hour and then cooled. A 44.5 gram sample of this prepolymer was blown by adding 0.7 ml. of water and 1.6 grams of the basic catalyst mixture described in Example 1. No surface active agents were used. The polymer had a density of 1.65 lbs./cu. ft. and a modulus of 15.5 at 10 percent deflection.

Although specific embodiments have been shown and described, it is to be understood they are illustrative, and not to be construed as limiting on the scope and spirit of the invention.

I claim:

1. The method of making a high modulus polymeric foam which comprises reacting an hydroxyl group-containing mixture of 700–1000 parts by weight of castor oil, 150–250 parts by weight of a polyol monoricinoleate selected from the group consisting of propylene glycol monoricinoleate and glyceryl monoricinoleate, 60–100 parts by weight of trimethylol propane, and 575–700 parts by weight of a polyethylene glycol having an average molecular weight of about 200, with an aromatic diisocyanate to form a pre-polymer having reactive isocyanato groups, and then concurrently foaming and cross-linking said pre-polymer by addition thereto of water and an amine catalyst.

2. The method according to claim 1 wherein said aromatic diisocyanate is toluene diisocyanate.

3. The method according to claim 1 wherein a mixture of said polyethylene glycol and trimethylol propane is first reacted with an excess of said aromatic diisocyanate, whereby a mixture of isocyanato-terminated reaction product and excess diisocyanate is formed, and then the resulting mixture is reacted with a blend of castor oil and said polyol ricinoleate to form said isocyanato-terminated pre-polymer.

4. The method according to claim 1 wherein a mixture of castor oil and said polyol ricinoleate is first reacted with an excess of said aromatic diisocyanate, whereby a mixture of isocyanato-terminated reaction product and excess diisocyanate is formed, and then the resulting mixture is reacted with said trimethylol propane and polyethylene glycol to form said isocyanato-terminated pre-polymer.

5. The method according to claim 1 wherein said prepolymer is foamed and crosslinked in the presence of a wetting agent.

6. A high modulus polymeric foam prepared according to claim 1.

References Cited in the file of this patent
UNITED STATES PATENTS 2,772,245    Simon et al. _____ Nov. 27, 1956
2,833,730    Barthel et al. _____ May 6, 1958